Inventors
George S. Allin, Sr.
John K. Liu
Paul O. Pippel
Attorney

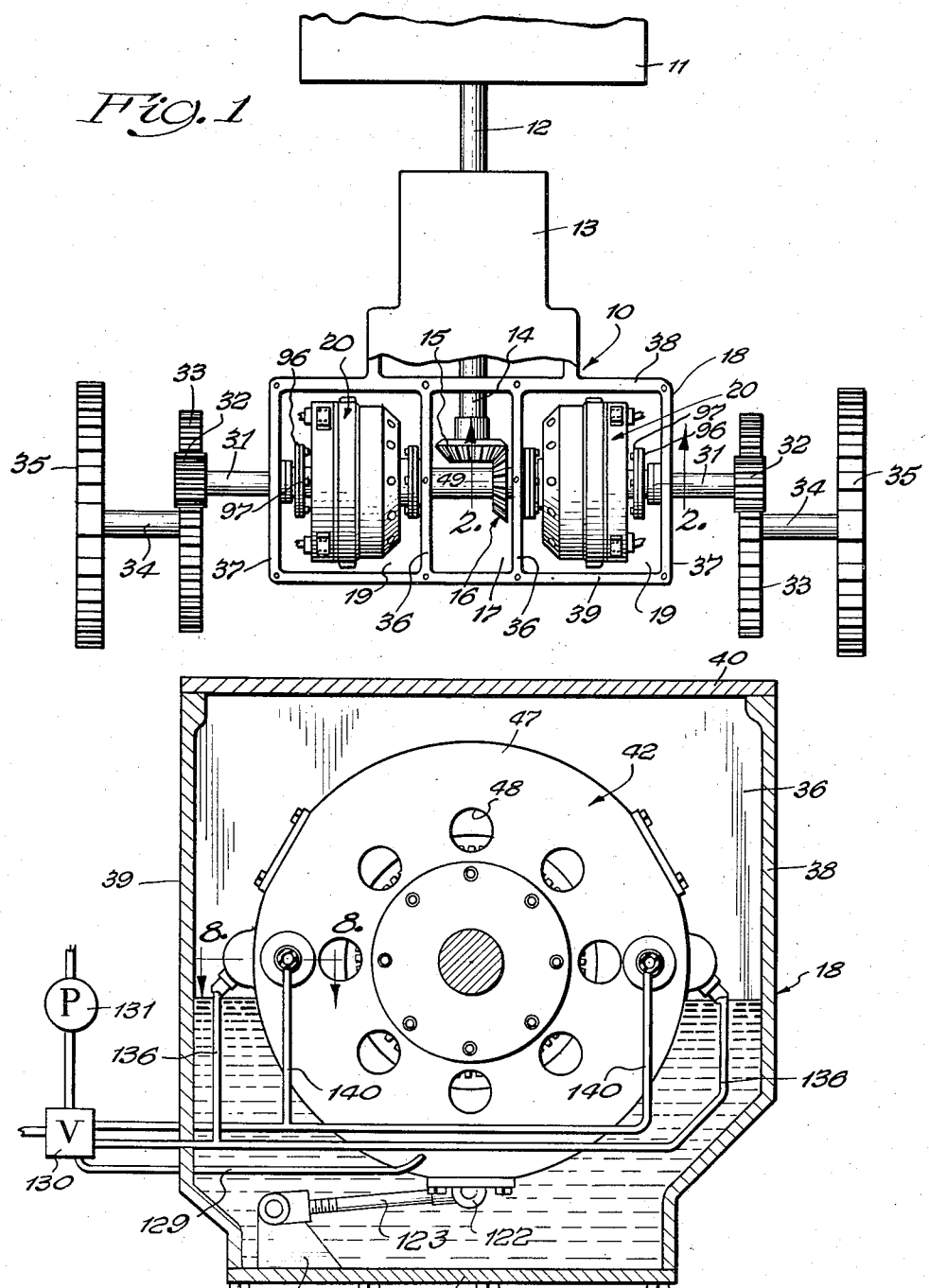

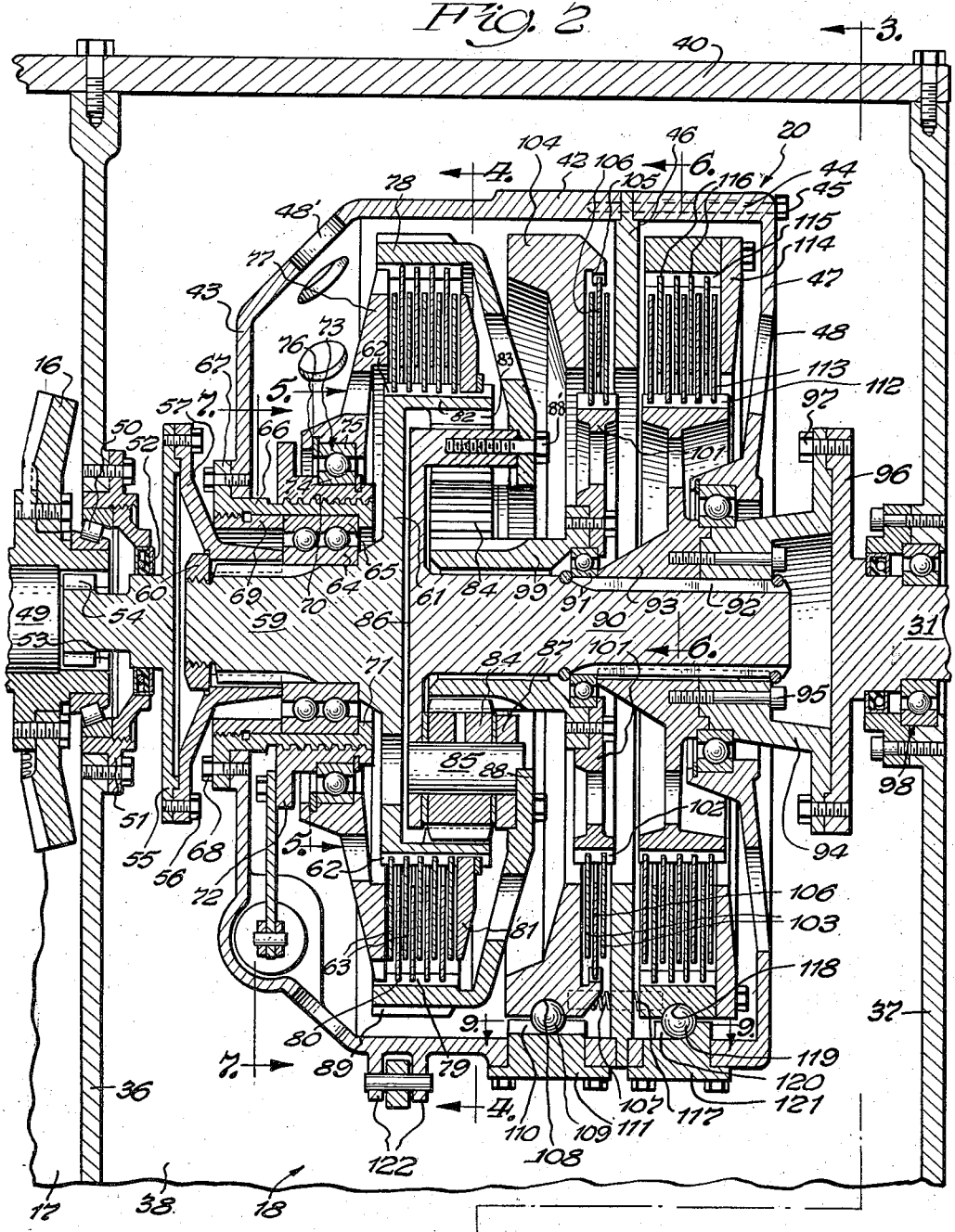

March 10, 1959 G. S. ALLIN, SR., ET AL 2,876,657
PLANETARY STEERING MECHANISM FOR CRAWLER TRACTORS
Filed Aug. 21, 1956 4 Sheets-Sheet 4
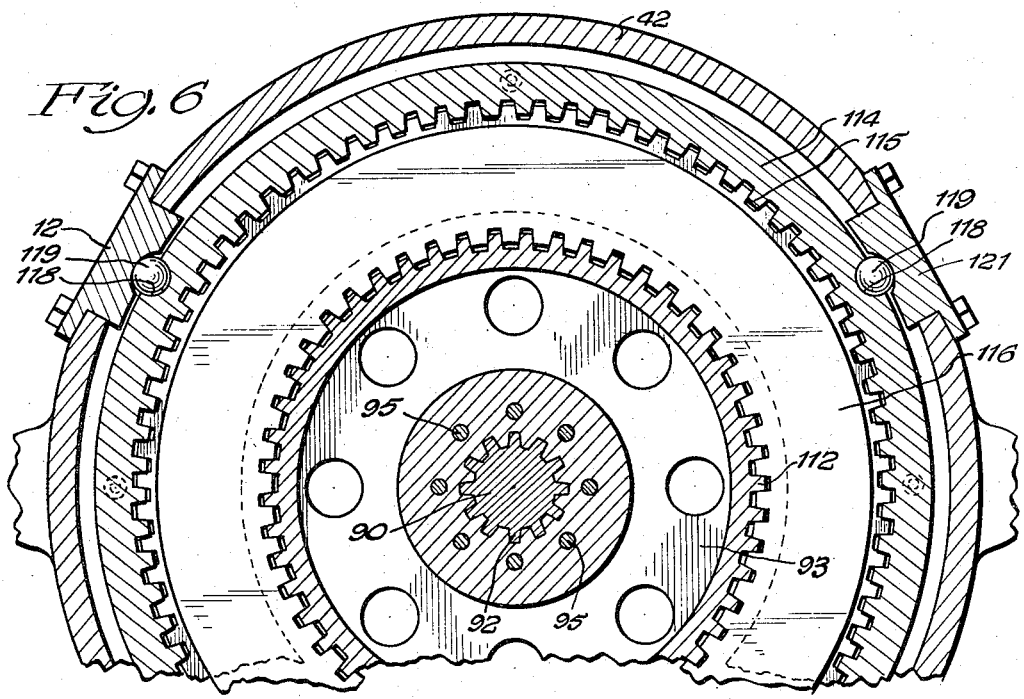
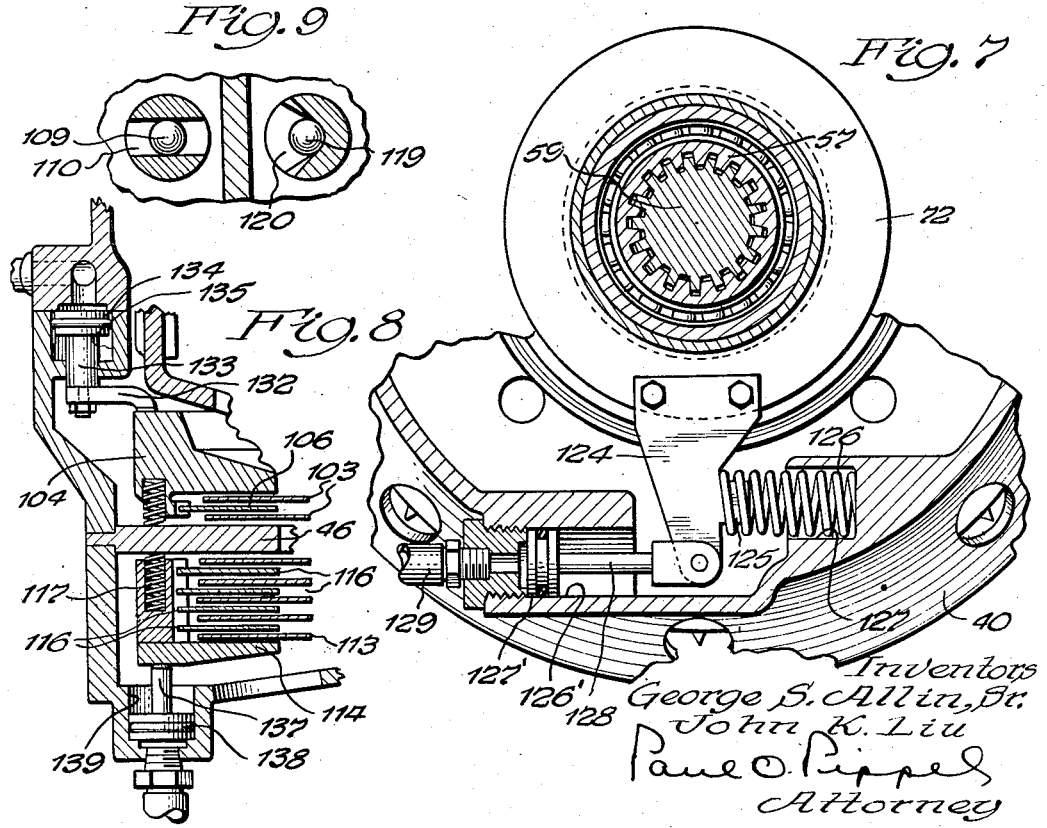
Inventors
George S. Allin, Sr.
John K. Liu
Paul O. Pippel
Attorney United States Patent Office 2,876,657
Patented Mar. 10, 1959

2,876,657
PLANETARY STEERING MECHANISM FOR CRAWLER TRACTORS

George S. Allin, Sr., Flossmoor, and John K. Liu, Chicago, Ill., assignors to International Harvester Company, a corporation of New Jersey Application August 21, 1956, Serial No. 605,329

9 Claims. (Cl. 74—710.5)

This invention relates particularly to a steering mechanism for crawler tractors and more specifically to a planetary steering unit.

It is a prime object of this invention to provide an improved planetary steering unit for crawler tractors the said unit being readily replaceable in the tractor structure for supplanting a more conventional type of clutch disk steering device.

Still another object is to provide an improved steering mechanism for crawler tractors wherein power from the engine is transmitted to both crawler tracks while the steering mechanism is actuated to accomplish turning movement.

A still further object is to provide an improved planetary type of steering mechanism comprising package type planetary units which may be readily adapted to a tractor structure in place of the conventional type of mechanism.

A still further object is to provide an improved planetary steering arrangement comprising individual planetary units individually removable to facilitate maintenance and replacement.

A still further object of this invention is to provide an improved planetary steering mechanism wherein during steering movement variation in speed between the crawler tracks is afforded.

A still further object is to provide an improved planetary steering mechanism for crawler tractors wherein the mechanism includes separable units individually operable to lock one or both of the crawler tracks during pivotal turning.

A still further object is to provide an improved planetary steering unit for crawler tractors, the unit being so designed that certain high stresses are absorbed in the operating elements of the unit whereby minimum stresses are directed against the casing construction of the unit, thus permitting lighter casing construction.

These and further objects will become more readily apparent from a reading of the description when examined in connection with the accompanying sheets of drawings.

In the drawings:

Figure 1 is a generally schematic plan view of a power train of a crawler tractor showing the power transmission elements from an engine to the drive sprockets of the crawler tracks, showing improved planetary steering units incorporated into the system;

Figure 2 is an enlarged cross-sectional view through a planetary steering mechanism and related structure taken substantially along the line 2—2 of Figure 1;

Figure 3 is a reduced cross-sectional view taken substantially along the line 3—3 of Figure 2;

Figure 6 is a cross-sectional view through a planetary disk lock arrangement taken substantially along the line 6—6 of Figure 2;

Figure 7 is a cross-sectional view through an actuating mechanism taken substantially along the line 7—7 of Figure 2;

Figure 8 is a cross-sectional view of an actuating device taken substantially along the line 8—8 of Figure 3; and Figure 9 is a fragmentary view taken substantially along the line 9—9 of Figure 2.

Figure 4:
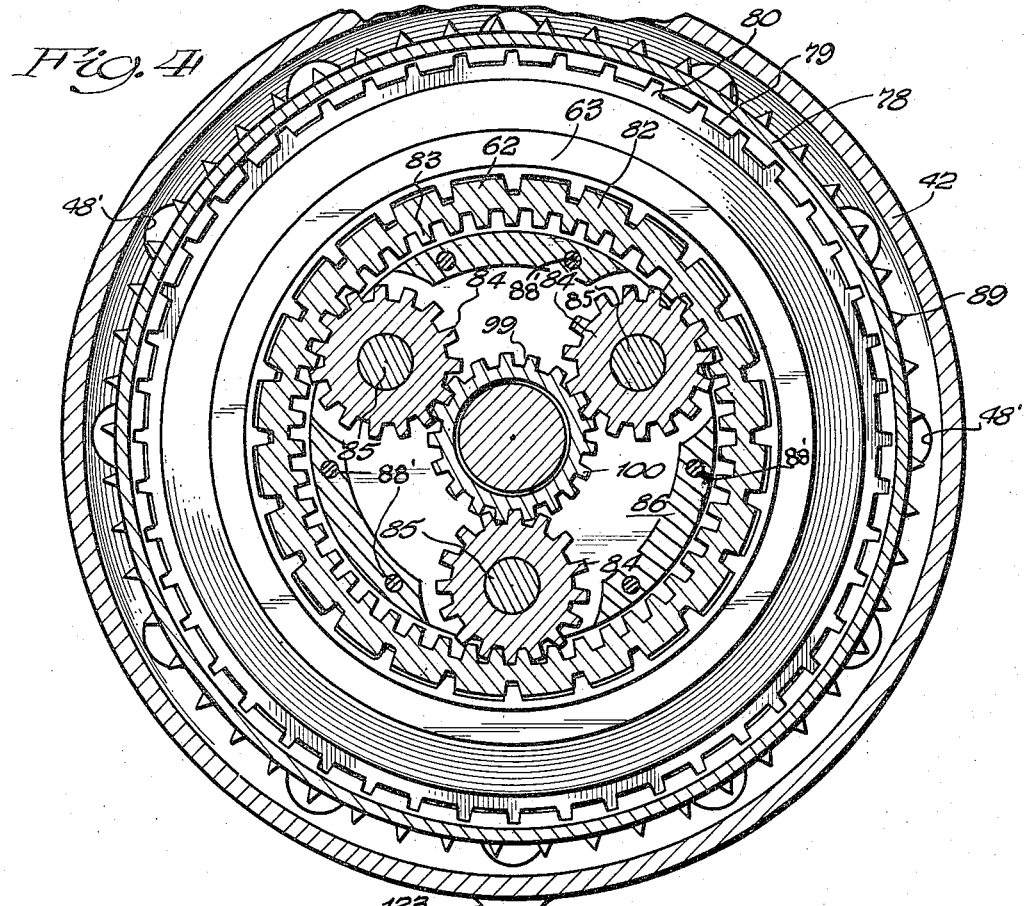
Figure 4 is a cross-sectional view through a planetary arrangement particularly along the line 4—4 of Figure 2.
Figure 5:
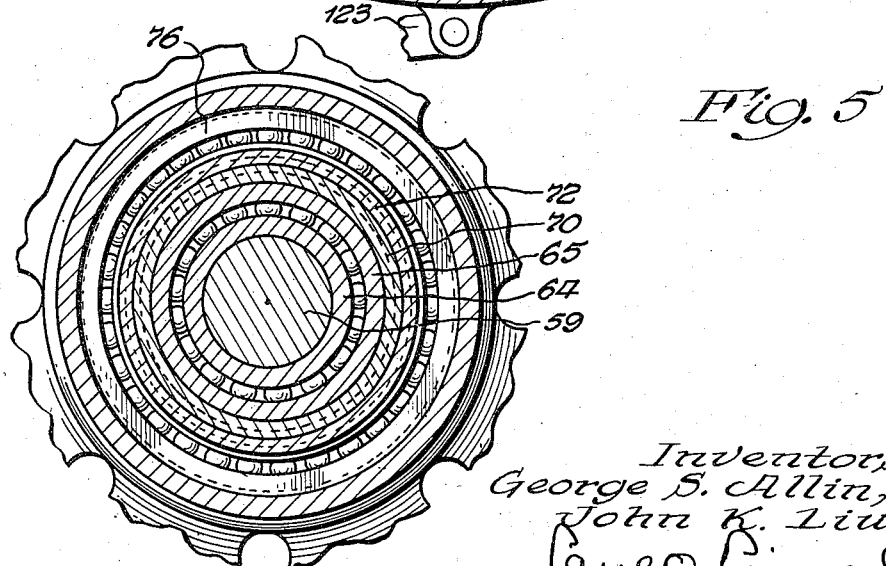
Figure 5 is a cross-sectional view taken substantially along the line 5—5 of Figure 2.

Referring now particularly to Figure 1 the crawler tractor power train or power transmitting arrangement is schematically shown and indicated generally by the reference character 10. The power transmitting mechanism 10 comprises essentially an engine 11 adapted to rotate a power output shaft 12 extending into a transmission casing 13 having a conventional transmission (not shown). A transmission shaft 14 projects outwardly from the transmission casing 13 and has connected thereto a bevel gear 15 which is in mesh with a bevel gear 16, the bevel gears 15 and 16 being enclosed in a center compartment 17 of a housing indicated at 18. Steering mechanism compartments 19 are provided in the housing 18. Each of the compartments 19 is provided with a planetary steering unit 20. Shafts 31 are supported on the housing 18 and each is connected to a pinion 32 which is in mesh with a reduction bull gear 33 adapted to rotate a sprocket shaft 34. The sprocket shafts 34 drive sprockets 35 which are suitably connected to crawler tracks or chains (not shown), for propelling a crawler tractor in a conventional manner. The compartment 17 is separated from the compartment 19 by means of a vertically extending wall 36. The housing 18 also includes outer walls 37 and front and rear walls 38 and 39 respectively. The housing 18 is also provided with a removable cover 40 and a removable bottom 41. These covers 40 and 41 of course may be made of sections so that any one of them may be removed without the necessity of removing the others for maintenance purposes.

Each planetary steering unit 20 comprises a cylindrical casing 42 having an end wall 43 and a removable section 44. The removable section 44 is connected to the casing portion 42 by means of a plurality of bolts 45 best shown in Figure 2. A thrust wall portion 46 is supported in place between the removable section 44 and the casing 42. The removable section 44 also includes a wall 47 having openings 48 communicating with the compartment 19. Likewise the wall 43 is provided with openings 48' communicating with the compartment 19.

The bevel gear 16 is rotatable on an input shaft 49 extending transversely within the compartment 17. The bevel gear 16 also is suitably supported for rotation on laterally spaced bearing assemblies 50 (only one of which is shown in detail in Figure 2) suitably connected to the walls 36, the said bearing assemblies also being supported by means of an oil retainer construction 51 having a suitable retainer element 52 connected thereto. The bevel gear construction 16 also is provided with an internal gear 53 suitably meshing with a spline or input member 54 integral with a drive plate or drive member 55. The drive plate 55 is connected by means of a plurality of bolts 56 to a driven member 57. The driven member 57 is suitably splined to a ring gear hub 59 and is held in place thereon by means of a nut 60. The ring gear hub 59 is integral with a clutch or disk carrier 61 having at its outer periphery a plurality of circumferentially extending and spaced teeth 62. A plurality of notched clutch disks 63 are carried for rotation with the carrier 61, the said notched clutch disks 63 being free to move axially but being held against relative rotation with respect to the disk carrier 61 by suitable notches which are engaged by the teeth 62.

An inner race 64 of a ball bearing assembly is carried on the ring gear hub 59. This bearing assembly also includes an outer race 65. The outer race 65 and bearing assembly is held in place by means of a tubular screw member 66 having an annular collar 67, the annular collar 67 being suitably connected to the wall 43 by means of a plurality of bolts 68. A sleeve 69 is suitably secured to the inner surface of the member 66 to retain the ball bearing assembly in position against axial displacement. The screw member 66 has at its outer periphery a screw thread 70. The member 66 also at one end is provided with an inwardly extending annular lip 71 which also serves to contain the bearing assembly. A helical screw member 72 is suitably threaded to engage the screw thread 70 of the screw member 66. A ball bearing 73 has an inner race 74 supported on the screw member 72 and an outer race 75 is held in the hub 76 of a thrust plate 77. An outer clutch or disk carrier comprises a plurality of internal teeth 79 rotatably supporting therewith a plurality of spaced clutch disks 80, the clutch disks 80 being suitably apertured at their outer peripheries to engage the teeth 79. The disk carrier 61 is also provided with a thrust plate 81 which is held on the carrier 61 against relative axial movement.

The disk carrier 61 is also provided with a ring gear 82 having a plurality of teeth 83. The ring gear 82 is in mesh with a plurality of planetary pinions 84. The planetary pinions 84 are journalled on shafts 85 secured to a planetary carrier 86. The shafts 85 also extend through integral portions 87, of planetary carrier 86, which are bolted to the hub section 88 of disk carrier 78 by means of bolts 88' only one of which is shown which support the hub section 88 of the disk carrier 78. The planetary carrier 86 includes a shaft 90. The shaft 90 also includes splines 92 which have keyed thereto a clutch or disk carrier 93 and power output member 94 which is suitably connected to the disk carrier 93 by a plurality of bolts 95. The pinion shaft 31 includes an annular plate, or drive connector 96 which is connected to the member 94 by a plurality of removable bolts 97. A bearing assembly 98 is suitably carried on the wall 37 to provide journal means for the pinion shaft 31.

The planetary pinions 84 revolve around a sun gear 99 having teeth 100 suitably meshing with the planetary pinions. The sun gear 99 is also journalled on the bearing 91 carried by shaft 90 and is suitably connected to a clutch or disk carrier 101. The disk carrier 101 includes a plurality of teeth 102 which have keyed thereto for rotation therewith a plurality of disks 103. An outer brake or disk carrier is designated at 104. The outer disk carrier 104 also includes teeth 105 which have keyed thereto a disk 106. The carrier 104 is normally urged in a direction away from the thrust wall 46 by means of a plurality of circumferentially disposed springs 107, one of which is shown in Figure 2. The carrier 104 is also provided with three circumferentially spaced sockets 108 having contained therein balls 109. The balls 109 are adapted to roll in slots 110 provided in removable guide members 111 suitably connected to the cylindrical casing 42 as best shown in Figures 2 and 9. The guide members 111 are placed about the circumference of the casing 42 at approximately 120° spacing. By virtue of the balls 109 and the guide members 111 the disk carrier 104 may move axially with respect to the wall 46 but is held against rotation with respect to the casing 42.

The disk carrier 93 includes a plurality of teeth 112 suitably splined to a plurality of disks 113. A brake or disk carrier 114 also includes a plurality of teeth 115 suitably splined to a plurality of disks 116. The disk carrier 114 also has connected thereto a plurality of circumferentially disposed springs 117, which as best shown in Figure 8, engage the thrust wall 46 and normally tend to urge the carrier 114 away from the said thrust wall. The carrier 114 also is provided with a plurality of sockets 118 spaced about the circumference at approximately 120° of the carrier 114. The sockets 118 have contained therein balls 119. The balls 119 are disposed in V grooves or slots 120 formed in removable guide members 121 as best shown in Figure 9.

The casing 42 is provided at its lower end with a pair of ears 122. An adjustable tie rod 123 is connected to a bracket 124 fastened to a bottom plate 41 on the housing 18. Each casing 42 also is provided with the openings 48 and 48' which permit entrance of oil from the housing to the said casings. Likewise, parts described above within the casing, are suitably apertured so that a thorough and effective oil flow is obtained through the steering units. Each casing 42 is held against rotation by means of the tie rods 123.

As best shown in Figures 2 and 7 the helical screw member 72 may be rotated by means of a bracket 124 suitably connected to the screw members 72. The bracket 124 also includes a projection 125 which holds a spring 126 captive within a recess 127 formed in the casing 42. The spring 126 normally rotates the screw member 72 in a direction whereby the thrust plate 77 moves axially to move the clutch disks 63 and 80 in tight engagement against the thrust plate 81. The casing is also provided with a cylinder 126' in which a piston 127' is mounted for reciprocation. The piston 127' is connected by means of a rod 128 to the bracket 124 for moving the member 72 against the normal tension of the spring 126. A conduit 129 is provided to supply fluid under pressure to the cylinder 126'. The conduit 129 may be directed to a suitable valve arrangement 130 schematically shown, the said arrangement being in communication with a pump 131 or suitable fluid pressure reservoir.

As previously indicated the springs 107 have a tendency to urge the disk carrier 104 away from the wall 46. However, as best shown in Figure 8, the disk carrier 104 is in contact with brackets 132 (only one being shown), each bracket 132 being suitably connected to a piston rod 133 connected to a piston 134 reciprocably positioned within a cylinder 135. Each cylinder 135 is, as best shown in Figure 3, in communication with a fluid conduit 136 leading to the valve 130. The disk carrier 114 also may be axially moved, as best shown in Figure 8, by means of a piston rod 137 which is adapted to push or engage the disk carrier 114 in a direction against the springs 117. The rod 137 is connected to a piston 138 reciprocably positioned within a cylinder 139. As indicated two of these cylinders 139 may be provided on the casing and fluid under pressure to the cylinders 139 is directed thereto by conduits 140 best shown in Figure 3.

The operation

The broad principle generally governing crawler tractor steering, of course applies in the present invention. By locking one of the sprockets on one side, of the tractor and by continued movement of the sprocket on the other side steering of the crawler tractor is obtained. This of course also holds true wherein one sprocket moves at a different speed from the sprocket on the other side thus effectuating steering. Since the present planetary type of steering unit has variable speed effective steering can be maintained while power is supplied to both sprockets. Power from the transmission 13 of course is imparted to the bevel gears 15 and 16 whereupon the shaft 49 and splines 54 (only one of which is shown) are rotated. By virtue of the spring 127 the screw member 72 has rotated on the thread 70 so that the disks 63 and 80 are tightly locked. When in this tightly locked condition of the disks 63 and 80, the disk carrier 78 is integrally locked with the thrust plate 77 and hub 76. Since the spline 54 is rotating the member 57 ring gear hub 59 and ring gear 82 are also rotating, this rotation is imparted to the planet carrier 86. Since the planet carrier 86 is under rotation, it in turn through the splines 92, imparts rotation to disk carrier 93. The output member 94 being securely connected to the carrier 93 of course also is driven by the planet carrier 86 thus rotating the drive connector 96, pinion shaft 31, which in turn through the pinion 32 and reduction gear 33 drives the sprocket 35 on each side of the crawler tractor. This arrangement provides high speed (or high gear) operation to both sides of the crawler tractor as desired. The steering units of course are actuated independently and thus a change in the speed or braking action on one side is independent of the other whereupon steering is provided. The actuation of the steering units will merely be described, it of course, being understood that the variations in speed or movement of the sprockets on either side governs the effective turning movement of the crawler tractor. During the high speed operation and direct drive of the planetary carrier 86 the sun gear 99 rotates freely thus imparting such free rotation to the disk carrier 101.

The operator now may decide to select low gear or low speed operation of one or both sprockets. In this case he actuates the valve 130 so that fluid under pressure is supplied to the conduit 129 whereupon the piston 127' moves the bracket 124 against the spring 126 causing rotation of the helical screw member 72 thereby causing the thrust plate 77 to move in a direction away from the thrust plate 81 whereupon the disks 63 and 80 are placed in relatively loose position and thus the disks are not locked. Simultaneously with the disengagement with disks 63 and 80 the operator directs fluid under pressure to the cylinders 135 by means of a conduit 136 whereupon the disk carrier 104 is moved against the action of the springs 107 toward the wall 46 and the disk plates 103 and 106 are locked tightly together. Thus the disk carrier 101 is now locked against rotation and the sun gear 99 remains in a stationary position. Since the sun gear 99 is now stationary, rotation of the carrier 61 causes rotation of the ring gear 82 which actuates the planetary pinions 84 to move about the stationary sun gear 99 thus rotating the planetary carrier 86 which again drives through the shaft 90, splines 92, the output member 94 which causes rotation of the pinion shaft 31 for rotating the sprockets. Thus the low speed (low gear) operation has been described. It can be seen that despite changes in speed, power may be maintained directly to either of the sprockets and thus to the crawler tracks.

During turning movement as conventionally termed, "pivot turns," fluid pressure is directed through the conduit 140 to the cylinder 139 whereupon the pistons 138 are actuated to move the rods 137 against the disk carrier 114 which, against the action of the spring 117, forces the disks 116 and 113 to become tightly locked. This locking of the aforementioned disks of course prevents the disk carrier 193 from rotating whereupon the pinion shaft 31 is also held stationary and the sprocket is locked against rotation. The shaft 90 of course is also now locked and thus the planet carrier 86 is held against rotation. The ring gear is rotating, and the disk carrier 61 is also rotating. However the piston 127' has been actuated so that the disks 63 and 80 are relatively loose. The pinions 84 are rotating since the carrier 61 is moving thus effecting rotation of the sun gear 99 which in turn causes idling or turning movement of the carrier 101 and the disks 103. Thus it can be seen that the steering units may be placed either into a high speed (high gear), low speed (low gear) and pivot turn positions. In both speed positions power is supplied to the tracks while in the pivot turn the sprockets may be effectively locked. In the high gear arrangement it is a simple matter to permit push starting in the event of battery failure since the drive is direct in the manner indicated. Thus in turning movement power is effective to both tracks during the turn. Furthermore, the pivot brake is operative to effectively brake the tractor when going down hill, or to lock one track while the other one is moving for effective pivot turns.

The individual planet steering units are readily removable by simple removal of the bolts 56 and 97 whereupon loosening of the tie rod 123 and disconnection of the hydraulic lines, the complete assembly can be removed quickly. This of course is extremely effective for service requirements. Also the structure is such that the planetary units can easily be placed into tractor structure which might also accommodate the more conventional disk brake units thus providing quick interchangeability. Thus the operator of the tractor when buying, can specify the type of steering arrangement he may desire. Furthermore the design and construction of the unit is such that the extreme stresses which are encountered are so circuited throughout the unit that minimum stresses are placed upon the associated structure.

For instance during the pivot brake, the thrust which is effective is first transmitted through the wall 46 then through the guide member 121 then through the balls 119 into the carrier 114 and thus into the disks 116 and 113. Thus the wall 47 is not affected by these thrust forces.

In the application of the thrust plate 77 the thrusts are taken through the carrier 77, the disks 80 and 63, the plate 81, through the ring gear 59, the nut 60, through the driven member 57, the bearing 65, the annular lip 71, the screw member 72 and bearing 73. Here again the thrust forces are so circuited that the housing is not substantially affected.

It is also evident, particularly from Figure 9, that the notch or V groove 120 is so shaped that any tendency of the carrier 114 to rotate in either direction during the clamping application of the disks 116 and 113 will cause the ball to travel upon either incline of the groove thereby more tightly clamping the said disks together. Thus any tendency of rotation immediately reacts as a self-energization of the disks to brake more tightly and thus become more securely locked. This greatly assists in the application of brakes during manual engagement in the case hydraulic pressure fails.

Thus the objects of the invention have been fully achieved. It must be understood of course that changes and modifications may be made in the construction without departing from the spirit of the invention nor the scope thereof as defined in the appended claims.

What is claimed is:

1. For a crawler tractor having a drive housing, sprocket drive shafts projecting from opposite sides of said housing, drive connectors on said sprocket drive shafts within said housing, a power input shaft on said housing between said sprocket drive shafts, and drive members connected to opposite sides of said input shaft; a steering mechanism comprising a pair of steering units, each unit including a casing having a power input member and a power output member, means removably connecting said power input member of each unit to said drive members, and said power members to said drive connectors, a first inner disk carrier connected to said power input member, a plurality of first disks on said first inner carrier, a ring gear connected to said first inner carrier for rotation therewith, a first outer disk carrier coaxial with said first inner disk carrier, second disks connected to said first outer carrier for rotation therewith, a thrust plate movable to engage said first and second disks, a screw member supported on said casing, a rotatable threaded member carried on said screw member adjacent said first and second disks, means connecting said threaded member to said thrust plate to move the same, a planet carrier rotatably supported within said casing, a plurality of planet pinions rotatably carried by said planet carrier and engaging said ring gear, a sun gear engaged by said planet pinions, a shaft on said planet carrier connected to said output member, a second inner disk carrier and a second outer disk carrier carried in said casing, third disks carried on said second inner disk carrier, fourth disks carried on said second outer disk carrier, means connecting said second inner disk carrier to said sun gear for rotation therewith, means mounting said second outer carrier for axial movement with respect to said second inner carrier and against rotation, locking means for locking said output member and said planet carrier against rotation comprising a third inner disk carrier connected for rotation with said output member, fifth disks on said third inner disk carrier, a third outer disk carrier, sixth disks on said third outer disk carrier, means positioning said third outer disk carrier against substantial rotation and for axial movement with respect to said third inner disk carrier comprising a plurality of sockets circumferentially disposed on said third outer disk carrier, balls in said sockets, a plurality of V-shaped grooved members circumferentially disposed on said casing and engaged by said balls, means for rotating said rotatable threaded member to move said thrust plate and said first and second disks into locking engagement whereby said first outer disk carrier and said planet carrier are locked and rotating movement of a first speed is imparted to said output member, means to disengage said first and second disks, means adapted to move said second outer carrier axially to lock said third and fourth disks in engagement whereby said sun gear is locked and said planet carrier is rotated in response to rotation of said first inner disk carrier whereby said output member is rotated at a second speed, means for moving said third outer disk carrier axially whereby said fifth and sixth disks are locked against rotation and said output member and planet carrier are held against rotation, means respectively releasing said first and second and third and fourth disks during locking of said fifth and sith disks, and releasable means on said casing engaging said housing to restrain said casing against rotation.

2. For a crawler tractor having a drive housing, laterally spaced sprocket drive shafts on said housing, drive connectors on said sprocket drive shafts, a power input shaft on said housing between said sprocket drive shafts, and drive members connected to opposite sides of said input shaft; a steering mechanism comprising a pair of steering units, each unit including a casing having a power input member and a power output member, means connecting said power input member of each unit to said drive members, and said power output members to said drive connectors, a first inner disk carrier connected to said power input member, a plurality of first disks on said inner carrier, a ring gear connected to said first inner carrier for rotation therewith, a first outer disk carrier coaxial with said first inner disk carrier, second disks connected to said first outer carrier for rotation therewith, a thrust plate movable to engage said first and second disks, a screw member supported on said casing, a rotatable threaded member adapted to engage said screw member, means connecting said threaded member to said thrust plate to move the same, a planet carrier rotatably supported within said casing, a plurality of planet pinions rotatably carried by said planet carrier and engaging said ring gear, a sun gear engaged by said planet pinions, a shaft on said planet carrier connected to said output member, a second inner disk carrier and a second outer disk carrier in said casing, third disks carried on said second inner disk carrier, fourth disks carried on said second outer disk carrier, means connecting said second inner disk carrier to said sun gear for rotation therewith, means mounting said second outer carrier for axial movement with respect to said second inner carrier and against rotation, locking means for locking said output member and said planet carrier against rotation comprising a third inner disk carrier connected for rotation with said output member, fifth disks on said third inner disk carrier, a third outer disk carrier, sixth disks on said third outer disk carrier, means positioning said third outer disk carrier against substantial rotation and for axial movement with respect to said third inner disk carrier comprising a plurality of sockets circumferentially disposed on said third outer disk carrier, balls in said sockets, a plurality of V-shaped grooved members circumferentially disposed on said casing and engaged by said balls, means for rotating said rotatable threaded member to move said thrust plate to move said first and second disks into locking engagement whereby said first outer disk carrier and said planet carrier are locked and rotating movement of a first speed is imparted to said output member, means to disengage said first and second disks, means adapted to move said second outer carrier axially to lock said third and fourth disks in engagement whereby said sun gear is locked and said planet carrier is rotated in response to rotation of said first inner disk carrier whereby said output member is rotated at a second speed, means for moving said third disk carrier axially whereby said fifth and sixth disks are locked against rotation, said output member and planet carrier are held against rotation, and means respectively releasing said first and second and third and fourth disks during locking of said fifth and sixth disks.

3. For a crawler tractor having a drive housing, sprocket drive shafts on said housing, drive connectors on said sprocket drive shafts, a power input shaft on said housing, and drive members connected to said input shaft; a steering mechanism comprising a pair of steering units, each unit including a casing having a power input member and a power output member, means connecting said power input member of each unit to said drive members, and said power output members to said drive connectors, a first inner disk carrier connected to said power input member, a plurality of first disks on said first inner carrier, a ring gear connected to said first inner carrier for rotation therewith, a first outer disk carrier coaxial with said first inner disk carrier, second disks connected to said first outer carrier for rotation therewith, a thrust plate moveable to engage said first and second disks, an actuating member supported on said casing and connected to said thrust plate, a planet carrier rotatably supported within said casing, a plurality of planet pinions rotatably carried by said planet carrier and engaging said ring gear, a sun gear engaged by said planet pinions, a shaft on said planet carrier connected to said output member, a second inner disk carrier and a second outer disk carrier carried in said casing, third disks carried on said second inner disk carrier, fourth disks carried on said second outer disk carrier, means connecting said second inner disk carrier to said sun gear for rotation therewith, means mounting said second outer carrier for axial movement with respect to said second inner carrier and against rotation, locking means for locking said output member and said planet carrier against rotation comprising a third inner disk carrier connected for rotation with said output member, fifth disks on said third inner disk carrier, a third outer disk carrier, sixth disks on said third outer disk carrier, means positioning said third outer disk carrier against substantial rotation and for axial movement with respect to said third inner disk carrier comprising a plurality of sockets circumferentially disposed on said third outer disk carrier, balls in said sockets, a plurality of grooved members circumferentially disposed on said casing and engaged by said balls, means for moving said actuating member to move said thrust plate and said first and second disks into locking engagement whereby said first outer disk carrier and said planet carrier are locked and rotating movement of a first speed is imparted to said output member, means to disengage said first and second disks, means adapted to move said second outer carrier axially to lock said third and fourth disks in engagement whereby said sun gear is locked and said planet carrier is rotated in response to rotation of said first inner disk carrier whereby said output member is rotated at a second speed, means for moving said third outer disk carrier axially whereby said fifth and sixth disks are locked against rotation, said output member and planet carrier are held against rotation, and means respectively releasing said first and second and third and fourth disks during locking of said fifth and sixth disks.

4. For a crawler tractor having a drive housing, sprocket drive shafts on said housing, drive connectors on said sprocket drive shafts, a power input shaft on said housing, and drive members connected to said input shaft; a steering mechanism comprising a pair of steering units, each unit including a casing having a power input member and a power output member, means removably connecting said power input member of each unit to said drive members, and said power output members to said drive connectors, a first inner disk carrier connected to said power input member, a plurality of first disks on said first inner carrier, a ring gear connected to said first inner carrier for rotation therewith, a first outer disk carrier coaxial with said first inner disk carrier, second disks connected to said first outer carrier for rotation therewith, a screw supported on said casing, a rotatable threaded member associated with said screw member and adapted to move said first and second disks into locking engagement, a planet carrier rotatably supported within said casing, a plurality of planet pinions rotatably carried by said planet carrier and engaging said ring gear, a sun gear engaged by said planet pinions, a shaft on said planet carrier connected to said output member, a second inner disk carrier and a second outer disk carrier carried in said casing, third disks carried on said second inner disk carrier, fourth disks carried on said second outer disk carrier, means connecting said second inner disk carrier to said sun gear for rotation therewith, means mounting said second outer carrier for axial movement with respect to said second inner carrier and against rotation, locking means for locking said output member and said planet carrier against rotation comprising a third inner disk carrier connected for rotation with said output member, fifth disks on said third inner disk carrier, a third outer disk carrier, sixth disks on said third outer disk carrier, means positioning said third outer disk carrier against substantial rotation and for axial movement with respect to said third inner disk carrier, means for rotating said rotatable threaded member to move said first and second disks into locking engagement whereby said first outer disk carrier and said planet carrier are locked and rotating movement of a first speed is imparted to said output member, means to disengage said first and second disks, means adapted to move said second outer carrier axially to lock said third and fourth disks in engagement whereby said sun gear is locked and said planet carrier is rotated in response to rotation of said first inner disk carrier whereby said output member is rotated at a second speed, means for moving said third outer disk carrier axially whereby said fifth and sixth disks are locked against rotation, said output member and planet carrier are held against rotation, and means respectively releasing said first and second and third and fourth disks during locking of said fifth and sixth disks.

5. For a crawler tractor having a drive housing, sprocket drive shafts on said housing, drive connectors on said sprocket drive shafts, a power input shaft on said housing, and drive members connected to said input shaft; a steering mechanism comprising a pair of steering units, each unit including a casing having a power input member and a power output member, means connecting said power input member of each unit to said drive members, and said power output members to said drive connectors, a first clutch means connected to said power input member, a ring gear connected to said first clutch means for rotation therewith, a second clutch means engageable with said first clutch means, a screw member supported on said casing connected to said first clutch means for actuating the same, a rotatable threaded member on said screw member and connected to said first clutch means, a planet carrier rotatably supported within said casing, a plurality of planet pinions rotatably carried by said planet carrier and engaging said ring gear, a sun gear engaged by said planet pinions, a shaft on said planet carrier connected to said output member, a first brake means, a second brake means engageable with said first means, means connecting said first brake means to said sun gear for rotation therewith, means mounting said second brake means for axial movement with respect to said first brake means and against rotation, locking means for locking said output member and said planet carrier against rotation comprising a third brake means connected for rotation with said output member, a fourth brake means engageable with said third clutch means, means positioning said fourth brake means against substantial rotation and for axial movement with respect to said third brake means, means for rotating said rotatable threaded member to move said first and second clutch means into locking engagement whereby said first clutch means and said planet carrier rotate and rotating movement of a first speed is imparted to said output member, means to disengage and first and second clutch means, means adapted to move said first and second brake means into engagement whereby said sun gear is locked and said planet carrier is rotated in response to rotation of said first and second clutch means whereby said output member is rotated at a second speed, means for moving said third and fourth brake means for locking them against rotation whereby said output member and planet carrier are held against rotation, means respectively releasing said first and second clutch means and first and second brake means during locking of said third and fourth brake means, and releasable means on said casing engaging said housing to restrain said casing against rotation.

6. For a crawler tractor having a drive housing, sprocket drive shafts on said housing, drive connectors on said sprocket drive shafts, a power input shaft on said housing, and drive members connected to said input shaft; a steering mechanism comprising a pair of steering units, each unit including a casing having a power input member and a power output member, means connecting said power input member of each unit to said drive members, and said power output members to said drive connectors, a first clutch means connected to said power input member, a ring gear connected to said first clutch means for rotation therewith, a second clutch means engageable with said first clutch means, a screw member supported on said casing connected to said first clutch means for actuating the same, a rotatable threaded member on said screw member and connected to said first clutch means, a planet carrier rotatably supported within said casing, a plurality of planet pinions rotatably carried by said planet carrier and engaging said ring gear, a sun gear engaged by said planet pinions, a shaft on said planet carrier connected to said output member, a first brake means, a second brake means engageable with said first brake means, means connecting said first brake means to said sun gear for rotation therewith, means mounting said second brake means for axial movement with respect to said first brake means and against rotation, locking means for locking said output member and said planet carrier against rotation comprising a third brake means connected for rotation with said output member, a fourth brake means engageable with said third brake means, means positioning said fourth brake means against substantial rotation and for axial movement with respect to said third brake means, means for rotating said rotatable threaded member to move said first and second clutch means into locking engagement whereby said first clutch means and said planet carrier rotate and rotating movement of a first speed is imparted to said output member, means to disengage said first and second clutch means, means adapted to move said first and second brake means into engagement whereby said sun gear is locked and said planet carrier is rotated in response to rotation of said first and second clutch means whereby said output member is rotated at a second speed, means for moving said third and fourth brake means for locking them against rotation whereby said output member and planet carrier are held against rotation, and means respectively releasing said first and second clutch means and first and second brake means during locking of said third and fourth brake means.

7. For a crawler tractor having a housing, sprockets supported on said housing, drive connectors on said sprockets, power input means on said housing, and a rotatable drive member connected to said power input means; a pair of planetary steering units on said tractor, each comprising a casing, a power input member on said casing removably connected to a drive member, a power output member removably connected to a drive connector, planetary drive means connecting said power input member and said power output member, means removably securing said casing to said housing against relative rotation, locking means for locking said planetary drive means against rotation including a first brake means connected to said planetary carrier for rotation therewith, second brake means mounted on said casing for limited rotational and axial movement, a plurality of circumferentially disposed ball members on said second brake means, a plurality of circumferentially spaced V-shaped grooves on said casing engaged by said ball members, and means for moving said second brake means in one direction to effect locked engagement with said first brake means, said balls and grooves during rotation of said first brake means interacting to urge said second brake means in the same above-mentioned direction to further such engagement during clockwise or counterclockwise rotation of said first brake means.

8. For a crawler tractor having a housing, sprockets supported on said housing, drive connectors on said sprockets, power input means on said housing, and a rotatable drive member connected to said power input means; a pair of planetary steering units on said tractor, each comprising a casing, a power input member on said casing removably connected to a drive member, a power output member removably connected to a drive connector, planetary drive means connecting said power input member and said power output member, means removably securing said casing to said housing against relative rotation, locking means for locking said planetary drive means against rotation including a first brake means connected to said planetary carrier for rotation therewith, second brake means mounted on said casing for limited rotational and axial movement, a plurality of circumferentially disposed ball members on said second brake means, a plurality of circumferentially spaced V-shaped grooves on said casing engaged by said ball members, and means for moving said second brake means in one direction to effect locked engagement with said first brake means, said balls and grooves during rotation of said first brake means interacting to urge said second brake means in the same above-mentioned direction to further such engagement during rotation of said first brake means.

9. For a crawler tractor having a housing, sprockets supported on said housing, drive connectors on said sprockets, power input means on said housing, and a rotatable drive member connected to said power input means; a pair of planetary steering units on said tractor, each comprising a casing, a power input member on said casing removably connected to a drive member, a power output member removably connected to a drive connector, planetary drive means connecting said power input member and said power output member, locking means for locking said planetary drive means against rotation including a first brake means connected to said planetary carrier for rotation therewith, second brake means mounted on said casing for limited rotational and axial movement, a plurality of circumferentially disposed ball members on said second brake means, a plurality of circumferentially spaced V-shaped grooves on said casing engaged by said ball members, and means for moving said second brake means in one direction to effect locked engagement with said first brake means, said balls and grooves during rotation of said first brake means interacting to urge said second brake means in the same above-mentioned direction to further such engagement during rotation of said first brake means.

References Cited in the file of this patent
UNITED STATES PATENTS

| | | |
|---|---|---|
| 1,351,942 | Chapron | Sept. 7, 1920 |
| 2,158,935 | Gustafson | May 16, 1939 |
| 2,405,549 | Beehman et al. | Aug. 13, 1946 |
| 2,569,651 | Bannan | Oct. 2, 1951 |
| 2,689,489 | Storer et al. | Sept. 21, 1954 |
| 2,725,763 | Stoekicht | Dec. 6, 1955 |
| 2,757,513 | Banker | Aug. 7, 1956 |

FOREIGN PATENTS

| | | |
|---|---|---|
| 614,340 | France | Sept. 14, 1926 |